Nov. 17, 1942.   H. H. HOLLY   2,302,651
PORTIONING MECHANISM
Filed March 29, 1941   3 Sheets-Sheet 1

Inventor:
Harry H Holly
Albert J Fihe
his Attorney.

Nov. 17, 1942.  H. H. HOLLY  2,302,651
PORTIONING MECHANISM
Filed March 29, 1941   3 Sheets-Sheet 2
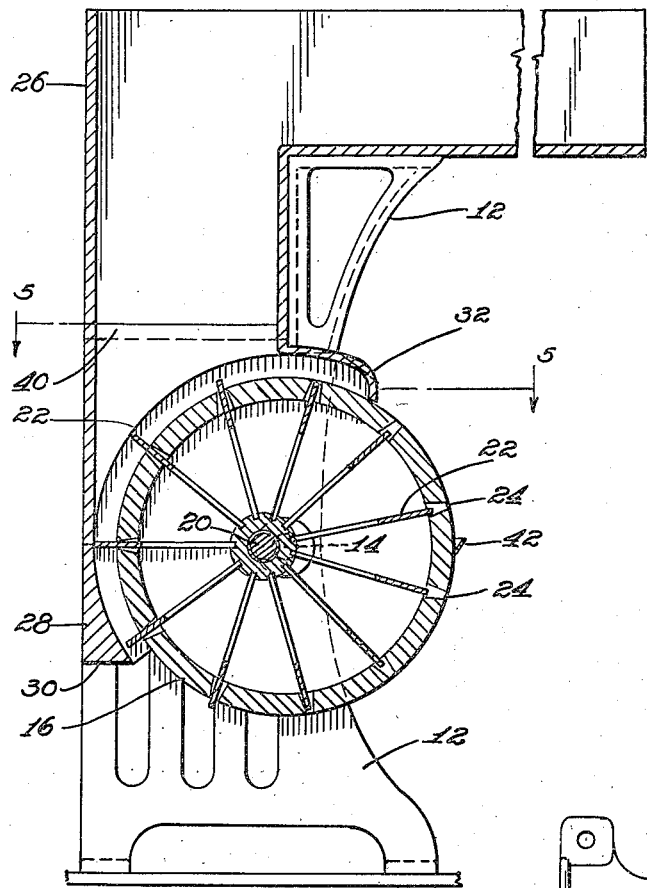
Fig. 1.
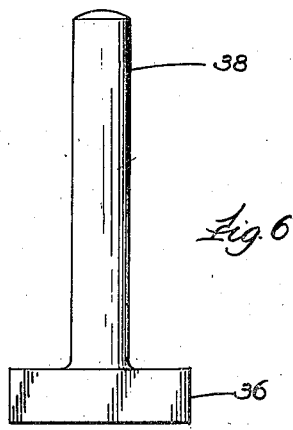
Fig. 6.
Fig. 7.
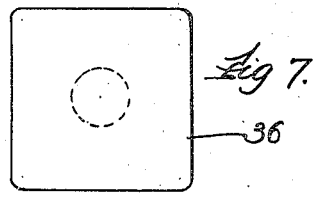
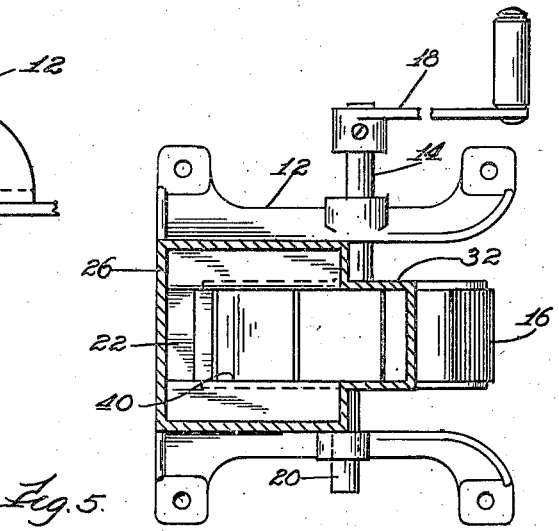
Fig. 5.
Inventor
Harry H. Holly.
Albert G. Fihe
his Attorney Nov. 17, 1942.  H. H. HOLLY  2,302,651
PORTIONING MECHANISM
Filed March 29, 1941  3 Sheets-Sheet 3
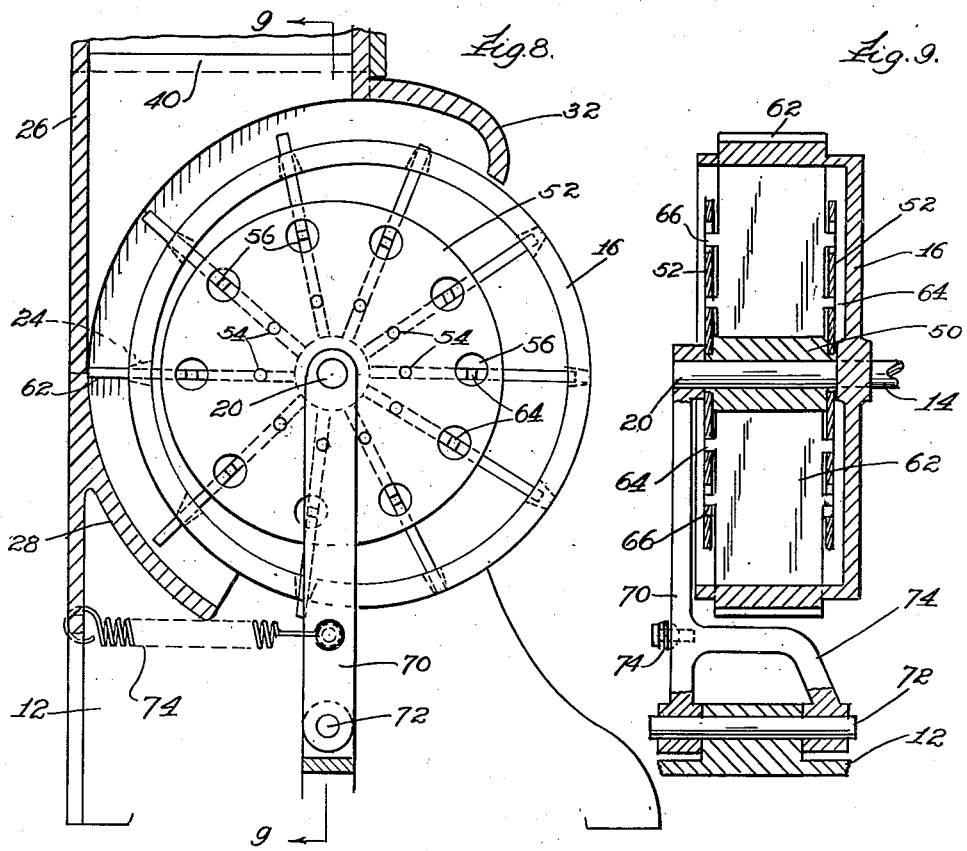
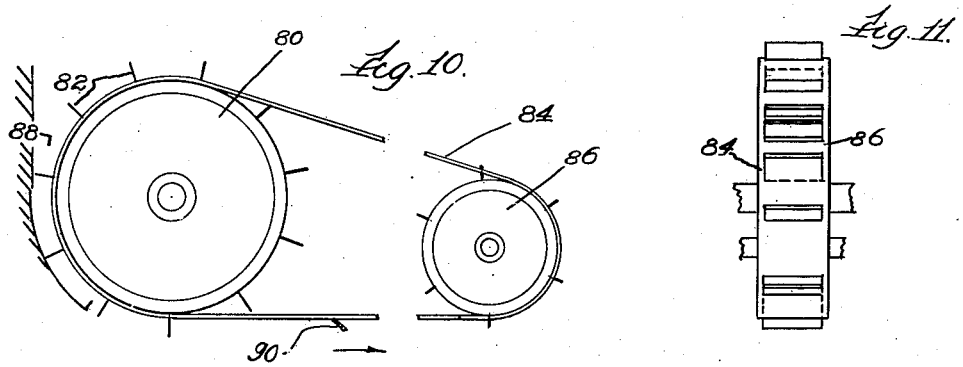
Inventor
Harry H. Holly.
by Albert G. Pike
his Attorney.

Patented Nov. 17, 1942

2,302,651

UNITED STATES PATENT OFFICE 2,302,651

PORTIONING MECHANISM

Harry H. Holly, Chicago, Ill., assignor to Holly Molding Devices, Chicago, Ill., a partnership composed of Harry H. Holly, Albert J. Fihe, Frank Manno, Irene Jessen, and Michael Salvato, all of Chicago, Ill.

Application March 29, 1941, Serial No. 385,811

11 Claims. (Cl. 107—15)

This invention relates to an improved portioning mechanism and has, for one of its principal objects, the provision of means for automatically portioning, measuring, partitioning and dispensing material, particularly plastic material and more especially ground meat such as used in the ordinary hamburger.

While the invention is primarily designed for measuring and separating a predetermined quantity of ground meat so that the same can be used in making the ordinary hamburger patty, it is obvious that the device may be employed in other and similar relationships such as in the portioning and separating of batches of dough used for cookies or in many other like situations where a preformed, accurately measured and suitably separated portion of some plastic material is the object.

One of the results to be attained by this invention is to provide a portion of meat which can be used for a hamburger patty or which may be a sausage cake or the like and which shall be of a predetermined weight. Heretofore, the ground meat used in hamburgers or the like has been portioned in a more or less haphazard manner usually by way of the ordinary ice-cream dipper which, besides being unsanitary, is not particularly accurate. The operator was never sure that his portions were of the desired weight, and experience has proven that the portions were usually either over or under weight. If under weight, the ultimate consumer complained, and if over weight, the proprietor of the hamburger dispensary lost money.

Another object of the invention is the provision of a portioning device for ground meat or the like which will make a patty of a definite shape besides of an accurate weight which patty can then either be directly cooked on a griddle and packed for shipping and later consumption or further shaped for hamburger or other purposes in a patty forming machine such as is shown in my prior Patents Numbered 2,081,455 and 2,224,390.

A still further object of the invention is to provide a portioner for ground meat or other plastic material which shall be quite speedy in its operation whereby considerable time will be saved and which, furthermore, will be entirely sanitary in that the meat or other material would not be touched by hand and also in that the machine, after use, can be readily disassembled for cleaning and sterilizing and as readily reassembled for further operation.

Other and further important objects of the invention will be apparent from the disclosures in the accompanying drawings and following specification.

The invention, in a preferred form, is shown in the drawings and hereinafter more fully described.

In the drawings:

Figure 4 is a vertical sectional view taken on the line 4—4 of Figure 2.

Figure 5 is a sectional view taken on the line 5—5 of Figure 4 and looking in the direction indicated by the arrows.

Figures 6 and 7 show a plunger used for forcing the meat or other plastic material from the hopper down into the portioning and ejecting mechanism.

Figure 8 is a detail view, partly in section, illustrating another form of the invention.

Figure 9 is a sectional view taken on the line 9—9 of Figure 8.

Figure 10 illustrates a further modified form of the invention.

Figure 11 is a top view of the structure of Figure 10.

As shown in the drawings:

Figures 1, 2:
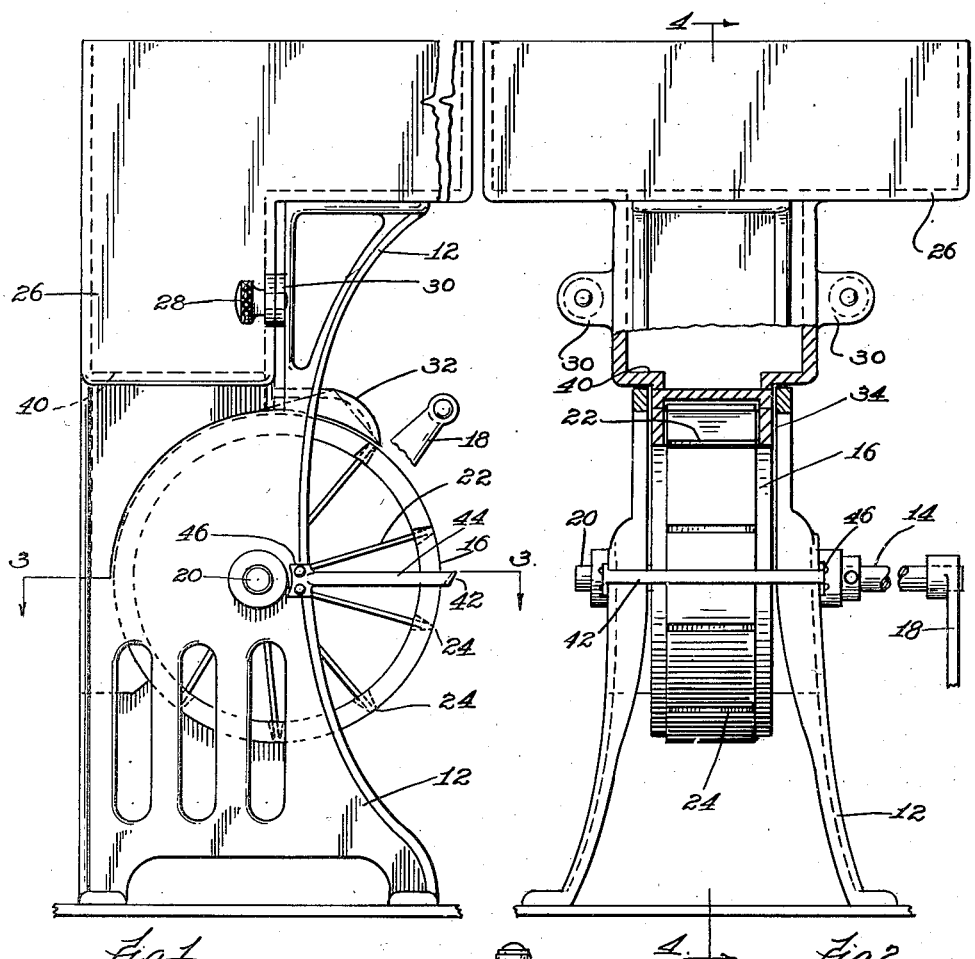
Figure 1 is a side elevation of the improved portioning mechanism of this invention, showing one embodiment of the invention.
Figure 2 is a front view of the device, parts being broken away to show the interior construction.

The reference numeral 12 indicates generally the framework of the improved portioning mechanism of this invention, the same being preferably of a casting but which may be made of stampings or otherwise assembled.

Rotatably mounted in the framework 12 on a shaft 14 is a drum 16, this drum being in cylindrical form and operated by means of a crank 18. The shaft 14 on which the drum is mounted is fitted onto only one side of the support 12 as best shown in Figure 3.

Mounted in the other side of the support 12 and on a shaft 20 is a rotor 22 comprising a series of fins or vanes, and the shaft 20 is slightly offset or eccentric so far as the shaft 14 is concerned.

The fins or vanes 22 which comprise the rotor are fitted into slots 24 cut into the periphery of the drum 16, and the offset or eccentric action is such that as the drum is turned, the rotor follows and the fins will project slightly therefrom on one face through the slots 24 while on the opposite face the fins will be retracted, all as best shown in Figure 4.

Figure 3:
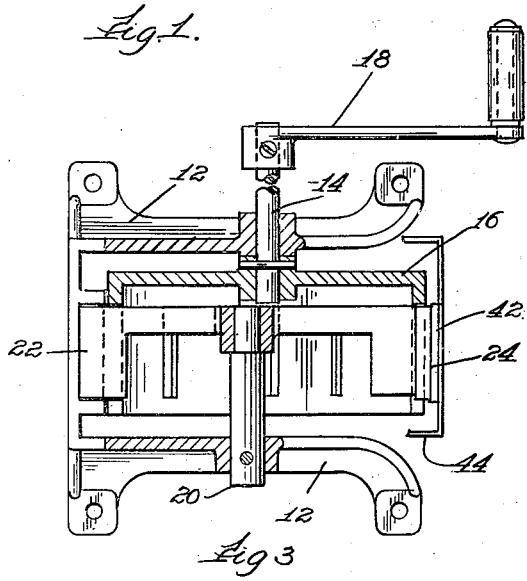
Figure 3 is a section taken on the line 3—3 of Figure 1, illustrating the interior construction.

The fins 22 are shaped somewhat as shown in Figure 3 so that they will flex or bend to some extent whereby the rotor as a whole will rotate with the drum 16 without undue friction. Obviously, the drum and rotor may be driven by means of a motor through a gear reducer if desired rather than by the hand crank 18.

Removably mounted on the upper portion of the base 12 is a hopper 26 shaped somewhat as shown in Figures 1, 2 and 4, but which obviously can be various or different sizes and shapes in order to meet the particular requirements. The base 12 extends upwardly as shown in Figure 4 so as to support the hopper and some suitable fastening means such as knurled or winged nuts 28 passing through and into suitable legs 30 on the hopper and base element respectively are provided for ready connecting and removal of the parts.

As best shown in Figure 4, the hopper 26 has an integral extension 28 curved on the inside to conform to the contour of the drum 16 and the rotor 22, and this extension is seated on a rod 30 formed on the base 12 both for better support and accurate positioning. This extension is for the purpose of retaining the portioned material between two fins for at least a part of the revolution of the drum after the material has been so deposited between two fins or vanes.

The base 12 itself has an integral extension 32 which fits over that portion of the drum practically diametrically opposite to the extension 28 of the hopper and which is for the purpose of retaining the plastic material in the hopper until such time as the fins or vanes 22 begin to project from the drum 16 in the composite rotation and force the material into desired position on the periphery of the drum and between two projecting fins.

Also, as best shown in Figure 2, the hopper has a shaped projection 34 extending downwardly and fitting inside the corresponding portion of the base 12 and against a shoulder formed on the periphery of the drum 16 so that the meat or other plastic material will not be able to escape or be squeezed out between the drum and the corresponding parts of the hopper at the sides thereof.

A plunger or stomper 36 is provided having a handle 38, this being adapted to fit into the corresponding portion of the hopper 26 whereby the ground meat or other plastic material can be pushed down by hand or otherwise against the periphery of the rotating drum 16. The hopper has integral inwardly extending shafts or ledges 40 whereby the downward action of the plunger 36 is limited so that it will not come into contact with the projecting vanes 22, and while a small portion of the material to be dispensed may, accordingly, remain in the hopper, this is negligible and may be either fed out by the use of a smaller plunger or by hand. Usually, more portions of material are simply added from that material remaining in the hopper or from material which may be added to the hopper from time to time.

A scraper in the form of a thin blade or the like 42 is provided at the open end of the machine and at a point on the drum where the vanes are fully retracted so that portioned material which might adhere to the drum will be definitely removed therefrom at this point. This blade is held in position by means of suitable supporting brackets 44 which are fastened to the frame 12 by means of bolts or rivets 46.

The operation will be obvious in that an amount of ground meat or other plastic material is placed in the hopper 26 and a portion of the same pushed down by the plunger or scraper 36 onto the periphery of the drum 16. The drum is rotated by the handle 18 or by some other means and, accordingly, carries with it the assemblage of rotor fins 22. The eccentric action of the rotor causes the fins to project from the surface of the drum, and the material in the hopper is forced against the corresponding periphery of the drum and between the projecting vanes, all as best shown in Figure 4. The eccentricity of the rotor is such that the vanes 22 project farthest from the surface of the drum at a point horizontally opposite the aligned supporting shafts 14 and 20, and this projecting fin works against the inner face of the element 28 to positively sever the material into a substantially square and flat portion or patty which will either drop off the drum as it reaches its lowest point or, otherwise, will be scraped off by the plate 42. These portions will obviously be of a predetermined size and weight and can be then used as explained above.

In the embodiment illustrated in Figure 8, a slightly different type of rotor is provided although the same type of drum is employed.

In this case, the rotor includes a central spindle or sleeve 50 rotatably mounted on the shaft 20, and to this sleeve is affixed by pressed fit, welding or the like, a pair of circular blades 52, one at each end thereof. Each of these blades has a series of openings therein, one series being rather small and close to the center and equidistant therefrom as illustrated at 54 and the other series being larger and closer to the periphery but also equidistant from the center as shown at 56.

Loosely mounted between the blades is a series of fins or vanes 62, each vane being provided with integral side extensions 64 and 66 respectively, these extensions or projections fitting into the openings 54 and 56. The fins or vanes 62 are not flexible, thereby differing from the fins 22, but they are allowed to enter and to work in slots 24 formed in the periphery of the drum 16 because of the freedom of motion provided by their support between the blades 52 and the positioning lugs 64 and 66 operating in the respective openings 54 and 56.

Another improvement resides in the mounting of the shaft 20 which supports the rotor 50—62. This, instead of being fixed in the framework 12, is mounted on a rockable arm 70 which is mounted as shown on a shaft 72 fixed in the base 12 and with an extra supporting or bracing element 74. A helical spring or the like 76 is connected to the arm 70 at one end and to the framework 12 at the other, thereby urging the entire rotor against the corresponding element 28 of the hopper 26 whereby a more definite and positive severing action of the segregated patties or portions is accomplished.

A further modification of the invention is shown in Figures 10 and 11 wherein a drum 80 is provided having fins or vanes 82 fixed in its periphery, and upon this drum is mounted a flexible band or the like 84 having slots 86 therein into and through which the fins 82 are adapted to project. As the drum 80 is rotated, this band 84 rides over a smaller drum 86 at the rear of the machine, and suitable hopper means 88 is provided for the application of the material to the band on the drum periphery. An ejecting means 90 is also provided. This may be operated either by hand or motive power.

The dimensions of the ejected preformed portions may be varied by different spacing of the slots and fins and also by varying the external diameter of the drum. For example, if a slightly heavier portion is desired, the periphery of the drum may be cut down to a corresponding extent. Also, the drum may be made wider and two or more preformed portions be made and ejected simultaneously.

I am aware that many changes may be made and numerous details of construction varied throughout a wide range without departing from the spirit of the invention, and I, therefore, do not purpose limiting the patent granted hereon otherwise than as necessitated by the prior art.

I claim as my invention:

1. A portioning mechanism comprising a support, a hollow drum rotatably mounted in the support, a rotor eccentrically positioned in the drum, vanes on the rotor, said vanes being pivotally mounted on the rotor and projecting through slots in the drum periphery, and means for feeding material onto the face of the drum and between pairs of vanes.

2. A portioning mechanism comprising a support, a hollow drum rotatably mounted in the support, a rotor eccentrically positioned in the drum, vanes on the rotor, said vanes projecting through slots in the drum periphery, means for feeding material onto the face of the drum and between the pairs of vanes, said means including a hopper on the framework and means for maintaining a sealed relationship between the hopper and the drum.

3. A portioning mechanism comprising a support, a hollow drum rotatably mounted in the support, a rotor eccentrically positioned in the drum, vanes on the rotor, said vanes projecting through slots in the drum periphery, means for feeding material onto the face of the drum and between the pairs of vanes, said means including a hopper on the framework, pressure feed means associated with the hopper and sealing flanges on the drum and contiguous parts of the hopper.

4. A portioning mechanism comprising a support, a hollow drum rotatably mounted in the support, a rotor eccentrically positioned in the drum, vanes on the rotor, said vanes projecting through slots in the drum periphery, a hopper for feeding material onto the face of the drum and between the pairs of vanes, and an extension of the hopper associated with the drum and vanes for severing and segregating the portions.

5. A portioning mechanism comprising a support, a hollow drum rotatably mounted in the support, a rotor eccentrically positioned in the drum, vanes on the rotor, said vanes projecting through slots in the drum periphery, means for feeding material onto the face of the drum and between the pairs of vanes, means associated with the drum and vanes for severing and segregating the portions, and a stripper for removing the segregated portions from the drum.

6. A portioning mechanism comprising a support, a hollow drum rotatably mounted in the support, a rotor eccentrically positioned in the drum, vanes on the rotor, said vanes projecting through slots in the drum periphery, means for feeding material onto the face of the drum and between the pairs of vanes, said means including a hopper on the framework, a shoulder on the drum and flanges on the hopper fitting into the shoulder for a material retaining relationship.

7. A portioning mechanism comprising a support, a hollow drum rotatably mounted in the support, a rotor eccentrically positioned in the drum, vanes on the rotor, said vanes projecting through slots in the drum periphery, means for feeding material onto the face of the drum and between the pairs of vanes, said means including a hopper on the framework, a shoulder on the drum and flanges on the hopper fitting into the shoulder for a material retaining relationship, an extension on the hopper projecting forwardly over the periphery of the drum to a point where the vanes are approximately flush with the surface thereof, and another hopper extension extending rearwardly of the drum and having an inner face substantially parallel with the drum surface.

8. A portioning mechanism comprising a support, a hollow drum rotatably mounted in the support, a rotor eccentrically positioned in the drum, vanes on the rotor, said vanes projecting through slots in the drum periphery, and means for feeding material onto the face of the drum and between the pairs of vanes, said means including a hopper on the framework the bottom portion of the hopper extending over and fitted onto the drum, an extension on the hopper having its under face in juxtaposition with the corresponding top portion of the drum, a shoulder on the drum and flanges on the hopper fitting into the shoulder for a material retaining relationship, and means for urging the vane edges into contacting relationship with the corresponding inner face of the juxtaposed hopper portion.

9. A portioning mechanism comprising a support, a hollow drum rotatably mounted in the support, a rotor eccentrically positioned in the drum, vanes on the rotor, said vanes projecting through slots in the drum periphery, and means for feeding material onto the face of the drum and between the pairs of vanes, said means including a hopper on the framework, each rotor vane comprising a semi-flexible blade.

10. A portioning mechanism comprising a support, a hollow drum rotatably mounted in the suppport, a rotor eccentrically positioned in the drum, vanes on the rotor, said vanes projecting through slots in the drum periphery, means for feeding material onto the face of the drum and between the pairs of vanes, said means including a hopper on the framework, the rotor vanes comprising a series of relatively stiff blades pivoted on the rotor and means for limiting the movement of the blades.

11. A portioning mechanism comprising a support, a hollow drum rotatably mounted in the support, a rotor eccentrically positioned in the drum, vanes on the rotor, said vanes projecting through slots in the drum periphery, means for feeding material onto the face of the drum and between the pairs of vanes, said means including a hopper on the framework, the rotor vanes comprising a series of relatively stiff blades, and means for allowing sidewise motion of the rotor blades.

HARRY H. HOLLY.